Feb. 1, 1938.  J. G. HUBBARD  2,106,913
OPEN HEARTH VALVE
Filed March 9, 1937
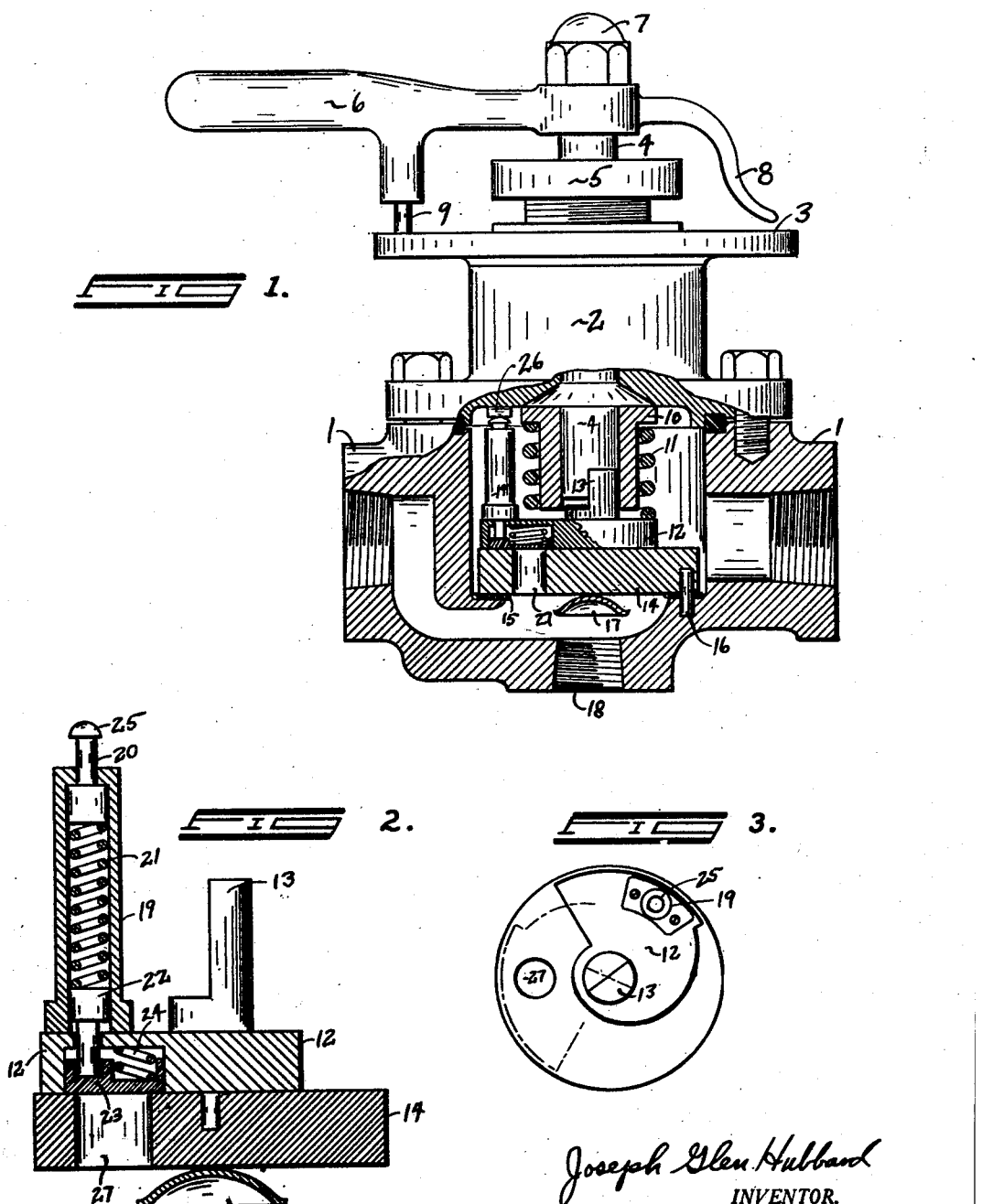
Joseph Glen Hubbard
INVENTOR.
BY W. B. Harpman
ATTORNEY.

Patented Feb. 1, 1938

2,106,913

UNITED STATES PATENT OFFICE 2,106,913

OPEN HEARTH VALVE

Joseph Glen Hubbard, Youngstown, Ohio

Application March 9, 1937, Serial No. 129,832

2 Claims. (Cl. 251—84)

REISSUED
SEP 3 - 1940

This invention relates to an open hearth fuel valve.

The principal object of this invention is to provide a valve particularly adapted to control the flow of fuel to an open hearth furnace.

A further object of this invention is to provide a valve so constructed that in full off position it will provide a positive leak proof closure.

A still further object of this invention is the provision of a valve adapted to control fuel for an open hearth furnace and to partially gasify the same through the introduction of steam into the said valve.

In supplying fuel to open hearth furnaces it is highly desirable that an accurate means of control be provided, as well as one which is convenient to operate. At the present time the majority of the fuel control means on open hearth furnaces comprise a series of ordinary wheel valves which must be individually set to supply the proper mixture of tar and oil and the various other substances used for fuel. Thus, at best, the fuel supply is chiefly a matter of guess work as there is no means provided for determining the correct amount or the quality of the fuel being supplied. In my invention I have provided a valve that, to a great degree, overcomes these obstacles in that it provides a single means of control, means for gasifying the fuel, and means for determining the most desirable quantity of fuel passed.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a side elevation of the assembled valve with parts broken away and parts in cross section.

Figure 2 is an enlarged detail view of the interior portion of the valve shown in Figure 1.

Figure 3 is a top plan view of the same interior portion of Figure 1 as shown in Figure 2.

By referring to Figure 1 of the drawing it will be seen that the numeral 1 indicates a body portion of the valve which has bolted thereto an upper body portion 2, an enlarged circular upper section 3 of which is adapted to be suitably marked to show the various operating positions of the valve. A stem 4 is centrally positioned within these body portions and has positioned around its upper section a suitable gland and adjustment nut 5. A handle 6 is held in place on the upper end of the stem 4 by means of a nut 7. This handle 6 is provided with an indicator 8 and a friction catch 9. The lower end of the stem 4 extends within the interior of the body 1 and has positioned about it a bushing 10 and a coil spring 11. Directly under the lower end of the stem 4 there is positioned a rotatable semi-cam shaped disk 12, an upright stem portion 13 of which engages the lower end of the stem 4. This rotatable semi-cam shaped disk 12 is positioned directly over and rests upon a circular disk 14 which in turn rests upon portions of the body 1. A suitable gasket 15 is provided at this point to insure a tight connection, and a pin 16 is positioned partly within the circular disk 14 and the body member 1 in order to prevent any rotation of the circular disk 14. A bell shaped baffle 17 is formed on the lower side of this circular disk 14 and is adapted to equally distribute steam being injected through the threaded opening 18 in the body 1.

The portion of this valve in which I am chiefly concerned is the unique construction of the closure means provided in the rotatable semi-cam shaped disk 12. By referring to Figure 2 of the drawing it will be seen that the disk 12 has positioned upon it the stem portion 13 and an upright hollow cylindrical member 19 which in turn has positioned within it a plunger 20, a coil spring 21, and a secondary plunger 22, the lower end of which extends downwardly into the rotatable cam-shaped disk 12 and touches a circular button-like insert 23. The insert 23 has also positioned between it and the rotatable semi-cam shaped disk 12 a secondary coil spring 24. The plunger 20 has a small knob 25 formed on its upper end after assembly, this knob 25 being adapted to contact a cam 26 (see Fig. 1) placed on the inside surface of the body member 2 at a position approximately over an opening 27 in the circular disk 14. This cam 26 is so placed that the plunger 20 will be forced downwardly when the knob 25 slides over the cam 26, thus compressing the spring 21 and causing extra tension downwardly through the plunger 22 and insert 23, thereby providing an effective closure when the valve is in a full off position. At such times as the valve is in any of the operating positions, the plunger 20 again rises to the position shown in Figure 2, thus releasing the extra tension previously supplied to the insert 23, as during this phase of the operating cycle the secondary coil spring 24 supplies adequate pressure on this insert 23.

By referring to Figure 3 it will be seen that the semi-cam shaped disk 12 has been turned partially to one side, thus placing the valve in a full on position. By continued turning in a clockwise direction the disk 12 will gradually cover the opening 27, thus effecting an adequate control.

By referring again to Figure 1 it will be seen that the valve is designed to receive the fuel at the right side and eject it from the left side. The opening 18 is provided to permit the insertion of steam at this point where it is suitably distributed and effectively mixed with the fuel by means of the baffle 17, thus producing a highly desirable gasifying action.

It is obvious that this valve may be used in controlling the flow of material other than open hearth fuel as specified herein, as it is equally as efficient in controlling any other liquid.

What I claim is:—

1. In a valve comprising body members drilled and tapped to form a fluid chamber therein, a circular disk within said chamber having an opening therein, a pin in said circular disk adapted to engage an opening in one of said body members, a rotatable cam shaped disk positioned upon the said circular disk, a stem formed on said rotatable cam shaped disk, an operating stem positioned in one of said body members and adapted to engage the stem formed on the rotatable cam shaped disk, a button-like insert positioned in said rotatable cam shaped disk and a coil spring also positioned in said rotatable cam shaped disk and adjacent to the said button-like insert, a secondary spring tension means positioned on the said cam shaped disk designed to apply extra tension to the said button-like insert, said secondary spring tension means comprising a cylindrical member positioned upon the said rotatable cam shaped disk, a pair of plungers and a coil spring positioned within said cylindrical member, one of said plungers adapted to contact a cam formed on an inside surface of one of said body members, and the other one of said plungers bearing against the said button-like insert, substantially as described.

2. In a valve comprising body members drilled and tapped to form a fluid chamber therein, a circular disk within said chamber having an opening therein, a pin in said circular disk adapted to engage an opening in one of said body members, a rotatable cam shaped disk positioned upon the said circular disk, a stem formed on said rotatable cam shaped disk, an operating stem positioned in one of said body members and adapted to engage the stem formed on the rotatable cam shaped disk, a button-like insert positioned in said rotatable cam shaped disk and a coil spring also positioned in said rotatable cam shaped disk and adjacent to the said button-like insert, a secondary spring tension means positioned on the said cam shaped disk designed to apply extra tension to the said button-like insert, said secondary spring tension means comprising a cylindrical member positioned upon the said rotatable cam shaped disk, a pair of plungers and a coil spring positioned within said cylindrical member, one of said plungers adapted to contact a cam formed on an inside surface of one of said body members, and the other one of said plungers bearing against the said button-like insert, means for gasifying the material being handled in the valve by mixing steam therewith, said means comprising an opening in one of said body members and a bell shaped baffle formed on the bottom of said circular disk at a point directly over the said opening, substantially as described.

JOSEPH GLEN HUBBARD.